United States Patent [19]
Nauflett et al.

[11] Patent Number: 5,461,648
[45] Date of Patent: Oct. 24, 1995

[54] SUPERCRITICAL WATER OXIDATION REACTOR WITH A CORROSION-RESISTANT LINING

[75] Inventors: George W. Nauflett, Oxon Hill; Robert E. Farncomb, Accokeek, both of Md.; M. Lalith Kumar, Pittsburg, Pa.

[73] Assignee: The United States of America as represented by the Secretary of the Navy, Washington, D.C.

[21] Appl. No.: 329,417

[22] Filed: Oct. 27, 1994

[51] Int. Cl.⁶ ..................................... G21C 9/00
[52] U.S. Cl. ............... 376/305; 376/292; 376/299; 376/312; 376/405; 376/306
[58] Field of Search .................. 376/305, 292, 376/299, 312, 405, 306; 588/16, 20, 8, 233, 236; 210/759, 178, 193; 165/2, 133; 252/181.3, 310

[56] References Cited

U.S. PATENT DOCUMENTS

| | | | |
|---|---|---|---|
| 3,375,169 | 3/1968 | McHugh et al. | 176/30 |
| 4,297,246 | 10/1981 | Cairns et al. | 252/465 |
| 4,421,569 | 12/1983 | Dichter et al. | 148/6.14 |
| 5,036,903 | 8/1991 | Shook | 165/1 |
| 5,092,129 | 3/1992 | Bayes et al. | 62/3.3 |
| 5,106,513 | 4/1992 | Hong | 210/759 |
| 5,108,697 | 4/1992 | Esposito et al. | 376/306 |
| 5,118,530 | 6/1992 | Hanneman et al. | 427/226 |
| 5,130,080 | 7/1992 | Niedrach | 376/305 |
| 5,130,081 | 7/1992 | Niedrach | 376/305 |
| 5,135,709 | 8/1992 | Andresen et al. | 376/305 |
| 5,147,597 | 9/1992 | Roofthooft et al. | 376/305 |
| 5,164,152 | 11/1992 | Kim et al. | 376/305 |
| 5,232,604 | 8/1993 | Swallow et al. | 210/759 |
| 5,313,965 | 5/1994 | Palen | 134/61 |
| 5,372,725 | 12/1994 | Halff et al. | 210/761 |
| 5,384,051 | 1/1995 | McGinness | 210/761 |
| 5,387,398 | 2/1995 | Mueggenburg et al. | 422/168 |

*Primary Examiner*—Donald P. Walsh
*Assistant Examiner*—Meena Chelliah
*Attorney, Agent, or Firm*—Roger D. Johnson

[57] ABSTRACT

A supercritical water oxidation reactor includes a vessel with an interior surface, two cooling sections, a heat exchanger, an oxygenating section, a pump, and a trap. The interior surface of the vessel has a corrosion-resistant, artificial ceramic or diamond-like coating. The artificial diamond coating is thin and crystal-like in structure. The heat exchanger is located between the two cooling sections. The heat exchanger and the two cooling sections surround the exterior of the vessel. The oxygenating section comprises a porous cylindrical baffle positioned within the vessel. The porous baffle transfers oxygen, hydrogen peroxide, or other oxygenating substances to an aqueous hazardous waste introduced into the reactor.

In accordance with another aspect of the invention, the oxygenating section includes a shaft having a helical extension. The shaft has a corrosion-resistant, artificial diamond or diamond-like coating on its outer surface. The shaft rotates the helical extension to assist in removing solids from the aqueous hazardous waste.

8 Claims, 3 Drawing Sheets

SUPERCRITICAL WATER OXIDATION REACTOR WITH A CORROSION-RESISTANT LINING

The invention described herein was made in the performance of official duties by a Navy contractor from Thar Designs, Inc. in conjunction with an employee of the Department of the Navy and may be manufactured, used, licensed by or for the Government for any governmental purpose without payment of any royalties thereon.

FIELD OF THE INVENTION

The present invention relates generally to a corrosion-resistant reactor and more particularly to a supercritical water oxidation reactor with a corrosion-resistant lining.

BACKGROUND OF THE INVENTION

The Department of Energy has chosen supercritical water oxidation as a promising technique for destroying hazardous and radioactive mixed waste. Supercritical water oxidation (SCWO) occurs by mixing water with hazardous waste and then heating and pressurizing this mixed water to supercritical values in an extraction vessel or reactor. The benefits of SCWO processes include short residence times, nearly complete efficiencies for destruction, and effectiveness for a large number of organic compounds.

One of the other advantages of SCWO includes its use of water. Water is inexpensive, non-toxic, and easily separated from many products. Water is also a convenient solvent because the material to be processed may already be in an aqueous solution, thereby eliminating the need to remove water from the final product. Further, the polarity of water can be controlled by temperature and pressure. Water is thus a good solvent for polar materials.

Unfortunately, the critical parameters of temperature and pressure for water are much higher than for other solvents. These high temperatures and pressures, plus the presence of oxygen, corrode the surfaces of any metallic pans located in a SCWO reactor. Severe metal corrosion occurs when the hazardous wastes include halogens and nitrates.

Current solutions to preventing severe corrosion to the metallic pans located in SCWO reactors include lining or coating these parts with exotic metals. Examples of such exotic metals include nickel, palladium, and alloys consisting mainly of nickel and copper or of nickel and chromium. These metals are expensive, difficult to machine, and cannot be coiled easily to provide a compact reaction chamber. Further, these exotic metal liners last for only a few hours of operation before their corrosion requires replacement. Accordingly, SCWO reactors need a smooth, inert lining for their metallic pans to resist corrosion.

Other shortcomings of the prior art include maintenance of the integrity of the seals after repeated use. Design of the sealing arrangement for a high pressure vessel such as an SCWO reactor is important not only to extend the life of the seals but also to prevent loss of hazardous materials, which would result in violations of safety regulations. Related art commonly uses a lid or head with a series of bolts which apply pressure on a seal such as an O-ring or a gasket made of gold or silver. These seals are exposed to the same corrosive environment which destroys the metallic parts within these reactors. Additionally, the bolted-down lids of these reactors are labor intensive to open and close, do not lend themselves to automation, and create considerable down time which all combine to increase overall operating costs.

Examples of other related art include U.S. Pat. No. 5,147,597 by Roofthooft et al. Roofthooft et al. disclose a prestablized chromium protective film which retards the build-up of radioactive contaminants on the inside surface of light water reactor systems. The film has a thickness of at least 500 Angstroms. Roofthooft et al. concentrate on reducing the formation of a radioactive isotope, Cobalt 59, and the corrosive products which are created by Cobalt 59 and are retained by steel piping during normal use.

Other related art includes U.S. Pat. No. 5,135,709 by Andresen et al. Andresen et al. disclose a method for reducing corrosion exposed to high-temperature water such as steam or water at about 150° C. or greater. The method concentrates on components formed from carbon steel, alloy steel, stainless steel, nickel-based alloys, and cobalt-based alloys. The method includes providing a reducing species, which can combine with the oxidizing species of the water, and forming a catalytic layer of a platinum group metal on the treated component. Andresen et al. do not specifically discuss high-temperature water containing hazardous wastes.

SUMMARY OF THE INVENTION

Accordingly, an object of the present invention is to destroy hazardous and radioactive mixed waste.

Another object is to reduce corrosion and degradation of metallic parts and seals caused by high concentrations of halogens, acids, alkali metals, ammonia, heavy metals, and other hazardous wastes in a reactor used for supercritical water oxidation.

Yet another object of the invention is to resist thermal shock and interaction with radionuclides present in a reactor used for supercritical water oxidation.

A further object is to enable quick, automated opening and closing of a supercritical water oxidation reactor.

The present invention attains the foregoing and additional objects by providing a supercritical water oxidation reactor with a corrosion-resistant lining. The supercritical water oxidation (SCWO) reactor comprises a vessel with an interior surface, two cooling sections, a heat exchanger, an oxygenating section, and a trap. The interior surface of the vessel has a corrosion-resistant, artificial ceramic, diamond, or diamond-like coating. The artificial diamond coating is thin and crystal-like in structure. The cooling sections of the vessel are located on the outer ends of the vessel, and each section includes an inlet for cold water or other cooling fluid and an outlet. The heat exchanger, located between the two cooling sections, may also have inlets and outlets for entry and exit of hot fluids. The oxygenating section comprises a porous cylindrical baffle positioned within the vessel. The porous baffle transfers either oxygen or hydrogen peroxide which travels through the cylindrical baffle. The trap has valves for removal of the waste product. A seal is located at each end of the vessel.

In accordance with another aspect of the invention, the oxygenating section includes a shaft having a helical extension. The shaft has a corrosion-resistant, artificial diamond or diamond-like coating. The shaft is porous to permit the addition of oxygen or hydrogen peroxide to the hazardous waste. The helical extension increases the removal of solids from the waste. A seal is located at each end of the vessel.

In accordance with another aspect of the invention, the SCWO reactor comprises a vessel with an interior surface, a heat exchanger, an oxygenating section, and a trap. The interior surface of the vessel has a corrosion-resistant lining which may be a ceramic or artificial diamond coating. The oxygenating section comprises a porous cylindrical baffle or a shaft positioned within the vessel. A seal is located at each end of the vessel.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The foregoing aspects and advantages of the present invention will be more fully understood from the following detailed description and reference to the appended drawings wherein.

DETAILED DESCRIPTION OF THE INVENTION

Figure 1:
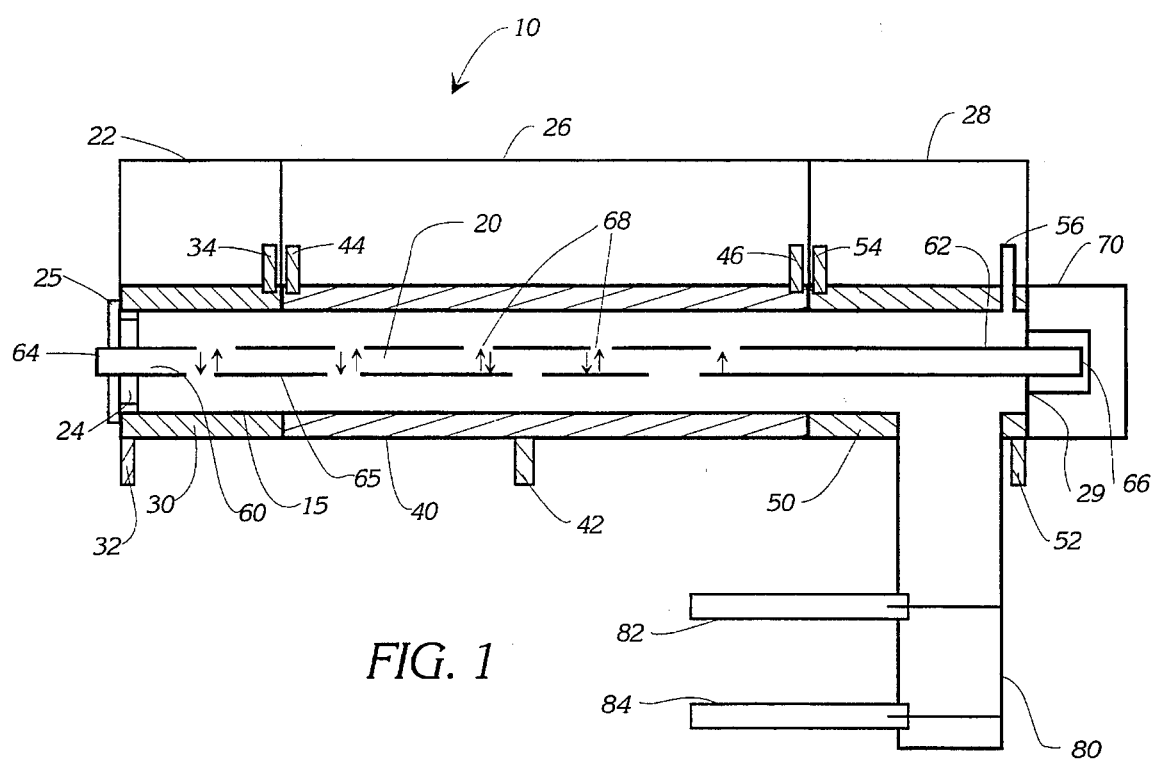
FIG. 1 is a cross-sectional view of a Supercritical Water Oxidation (SCWO) reactor with a corrosion-resistant lining in accordance with the present invention.

Referring now to FIG. 1, a supercritical water oxidation (SCWO) reactor 10 is shown having a corrosion-resistant lining 15 in accordance with the present invention. The SCWO reactor comprises a vessel 20, a first cooling section 30, a heat exchanger 40, a second cooling section 50, an oxygenating section 60, and a trap 80.

The vessel 20 has an inner surface which is coated with the corrosion-resistant lining 15. The lining 15 is an artificial ceramic or diamond coating. The artificial diamond coating is thin and crystal-like in structure. This structure is capable of withstanding pressures up to 350 atm and temperatures up to 650° C. Additionally, this coating's structure resists chemically reacting with a mix of water, carbon dioxide, oxygen, ambient air, fluorides, halides, and salts. The diamond coating also resists thermal shock, interaction with radionuclides, and high concentrations of halogens, acids, alkali metals, ammonia, heavy metals, and other hazardous wastes.

Figure 4:
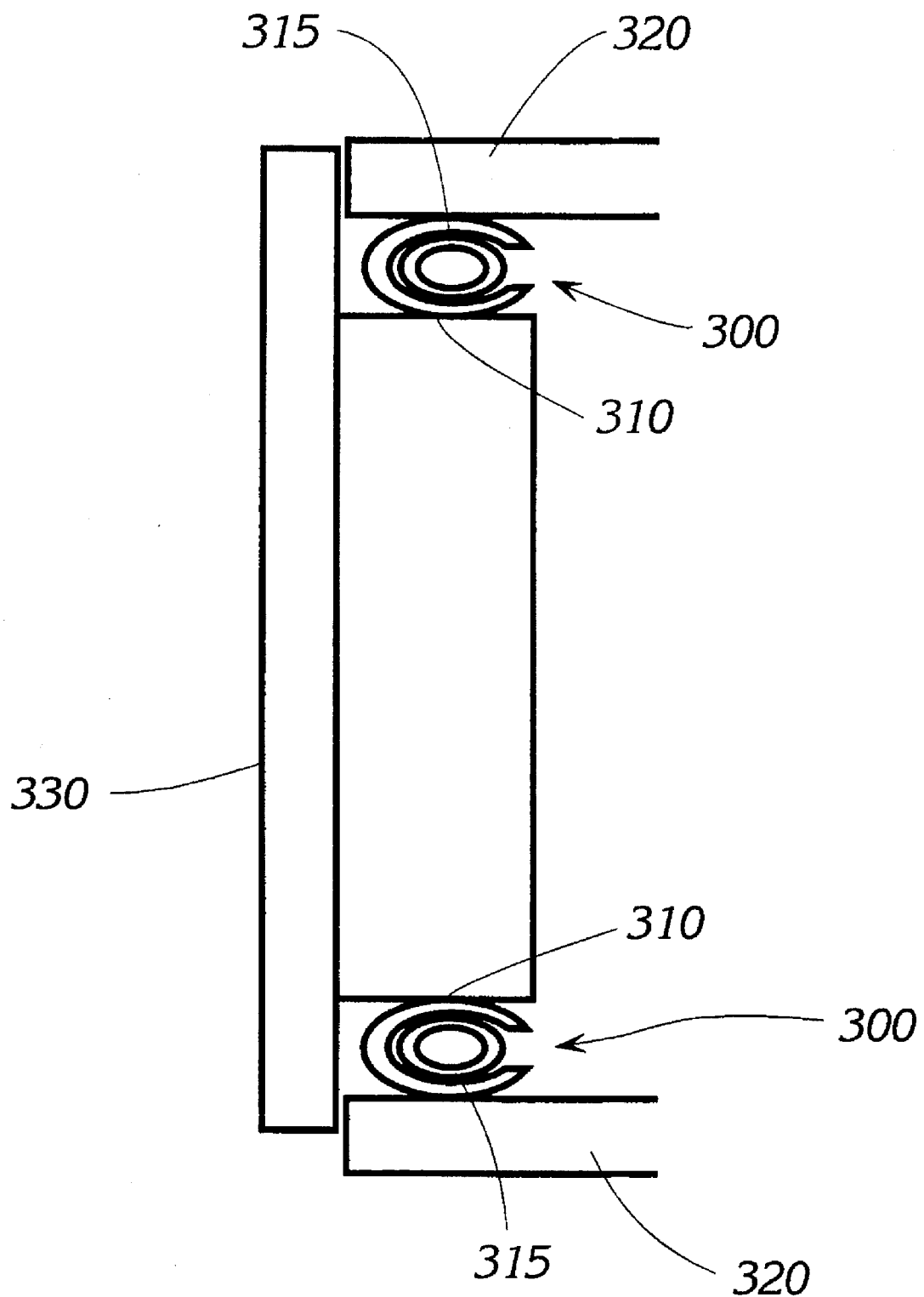
FIG. 4 is a cross-sectional view of a seal assembly which includes a spring-loaded, graphite-reinforced polytetrafluorethylene seal.

The vessel 20 has an outer region 22 which includes an opening 24 where an aqueous solution of hazardous and radioactive mixed waste enters. A seal assembly 25 inserts between the end of the vessel 20 and a pump (not shown) for the SCWO system. The seal assembly 25 prevents leakage of hazardous waste between the interface of the pump and the vessel. The seal assembly 25 may include a conventional seal such as an O-ring or a gasket. Alternatively, the seal assembly includes a spring-loaded, graphite-reinforced polytetrafluorethylene seal as shown in FIG. 4. The product polytetrafluorethylene is sold under the trademark TEFLON.

Referring again to FIG. 1, a cooling section 30 circumferentially surrounds the vessel 20 at outer region 22. The cooling section 30 includes an inlet 32 for supplying cold-water or any other cooling liquid to the section 30. The liquid exits through outlet 34. The cooling section 30 cools the aqueous mixed waste before it reaches inner region 26 and prevents conditions at the seal assembly 25 from reaching supercritical levels.

A heat exchanger 40 circumferentially surrounds the inner region 26 of the vessel. The heat exchanger 40 has an inlet 42 for supplying a hot fluid having a temperature in the range of 300° C. to 700° C. The hot fluid exits through outlets 44 and 46. Alternatively, the heat exchanger 40 comprises an electrical heating coil wrapped around the exterior of vessel 20. The heat exchanger 40 heats the aqueous mixed waste to supercritical values.

A second cooling section 50 circumferentially surrounds a second outer region 28 of the vessel. The second cooling section 50 includes an inlet 52 for supplying cold-water to the exchange and an outlet 54. The cooling section 50 also has a pressure release valve 56 for regulating back pressure within the vessel 20. The cooling section 50 cools the aqueous mixed waste below supercritical conditions before the waste reaches outlet 29 of the vessel. This cooling reduces the corrosive environment at the outlet 29 and thereby increases the life of seal assembly 70 located at the outlet.

Positioned within the vessel 20 is an oxygenating section 60. Section 60 comprises a porous cylindrical baffle 62 having an inlet 64, an outlet 66, and a plurality of disbursing holes 68. The cylindrical baffle 62 extends axially within the interior of the vessel. Inlet 64 receives an oxygenating agent such as oxygen or hydrogen peroxide. The agent travels within the baffle 62 and exits through the holes 68 into the aqueous mixed waste. The exterior surface of the baffle has an artificial diamond coating 65 along the inner surface of the vessel. The artificial diamond coating is thin and crystal-like in structure. The properties of coating 65 are similar to the lining 15.

A seal assembly 70 is located at the outlet 29 of the vessel and the outlet 66 of the baffle. The seal assembly 70 preferably includes spring-loaded, graphite-reinforced polytetrafluorethylene seal. Alternatively, the seal assembly 70 may include an O-ring or gasket held into place by a bolted-down lid.

A trap 80 is also located at the outlet 29 of the vessel. The trap has two valves 82 and 84 for removing waste product separated from the aqueous mixture.

Figure 2:
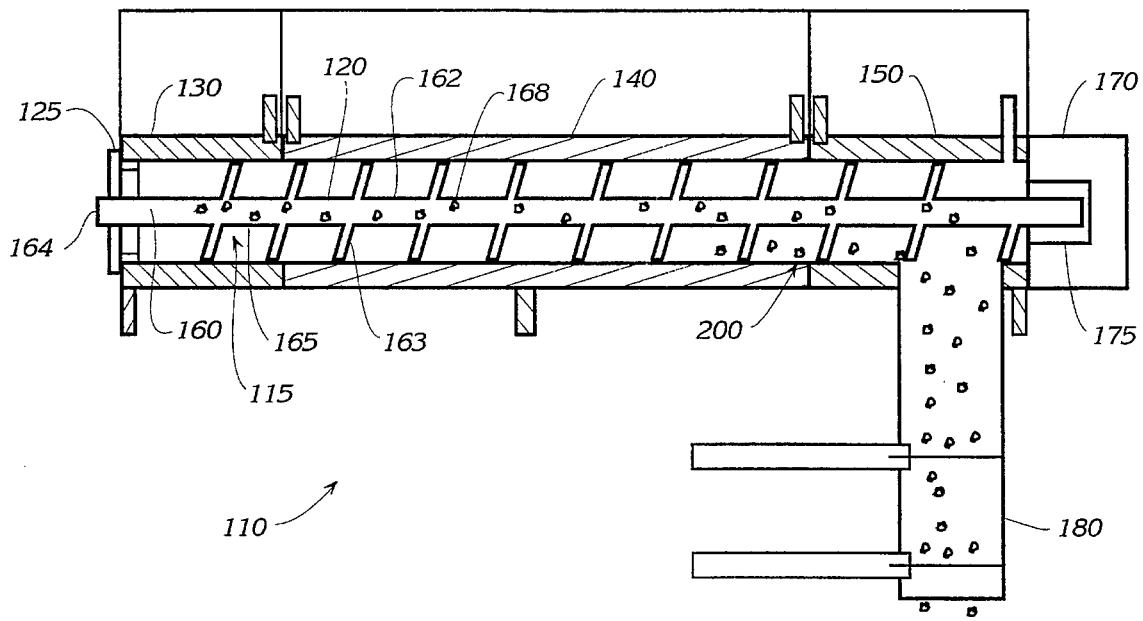
FIG. 2 is a cross-sectional view of a SCWO reactor including a shaft with a helical extension in accordance with another aspect of the present invention.

In accordance with another aspect of the invention, FIG. 2 illustrates a SCWO reactor 110 having a corrosion-resistant lining 115. The SCWO reactor 110 comprises a vessel 120, a first seal assembly 125, a first cooling section 130, a heat exchanger 140, a second cooling section 150, an oxygenating section 160, a second seal assembly 170, a rotating drive 175, and a trap 180.

The components of reactor 110 are substantially similar to the components of reactor 10. The reactor 110, however, has a different oxygenating section 160 and a rotating drive 175.

The oxygenating section 160 comprises a porous shaft 162 positioned concentrically within the vessel 120. The shaft 162 has a helical extension 163 which wraps axially about the shaft 162. The shaft 162 extends axially within the interior of the vessel and connects to the rotating drive 175. An inlet 164 receives an oxygenating agent such as oxygen or hydrogen peroxide. The oxygenating agent travels within the shaft 162 and exits through disbursing holes 168 into the aqueous mixed waste. The exterior surface of the shaft 162, including the helical extension 163, has an artificial diamond coating 165 to resist corrosion. This coating is similar to the lining 115 covering the inner surface of the vessel 120 and the lining 15 covering the inner surface of vessel 20 in FIG. 1. The coating is thin and crystal-like in structure.

Referring again to FIG. 2, the rotating drive 175 rotates the shaft 162. The helical path through which the aqueous hazardous mixed waste travels in vessel 120 aids in the removal of solids 200 from the aqueous mixed waste. In particular, the helical path increases the mass transfer coefficient of the mixed waste, which in turn increases the rate of reaction. This increase facilitates physical separation and reduces the reaction time.

Figure 3:
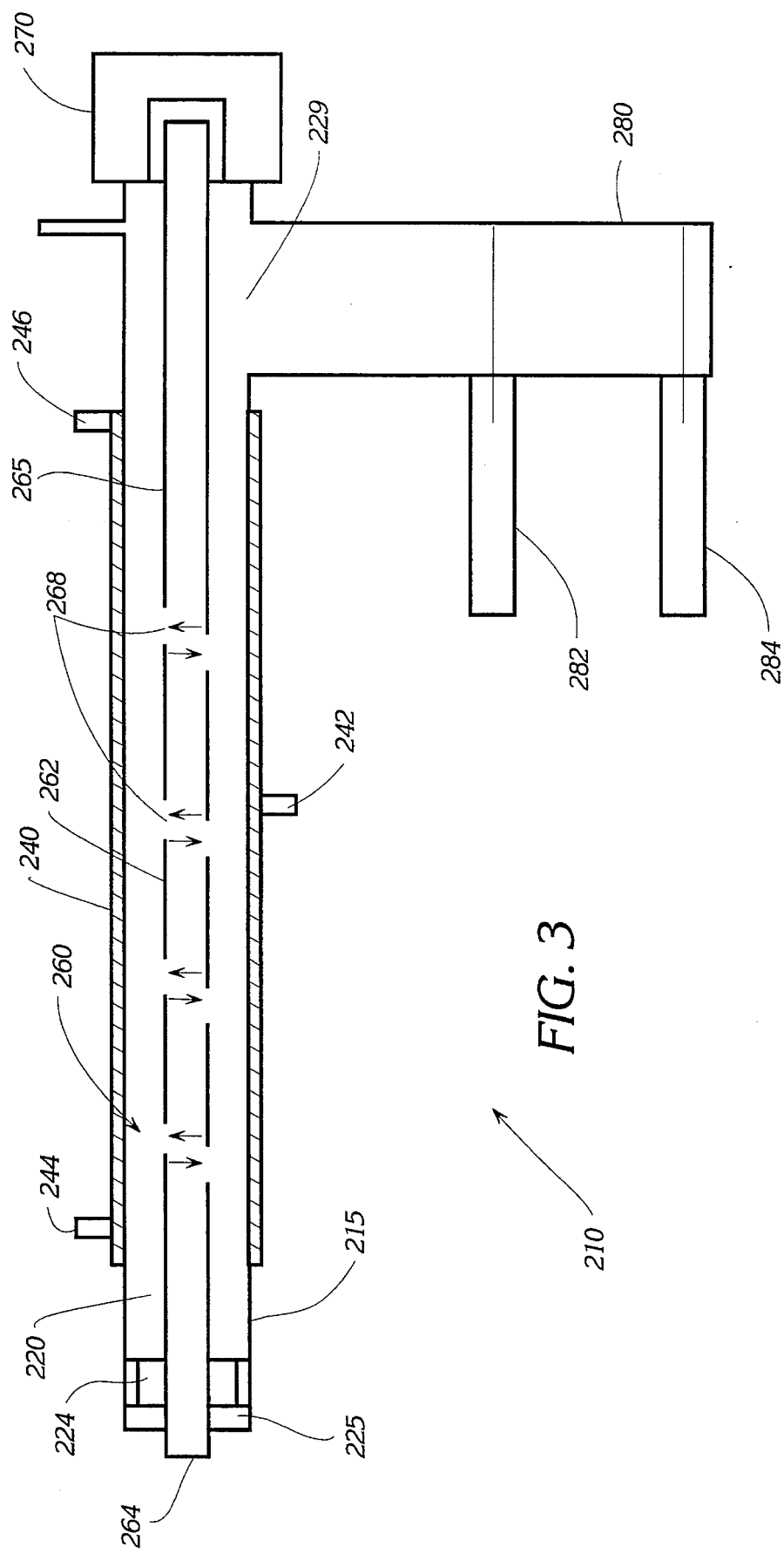
FIG. 3 is a cross-sectional view of a SCWO reactor with a corrosion-resistant lining in accordance with another aspect of the present invention.

In accordance with another aspect of the invention, FIG. 3 illustrates a SCWO reactor 210 having a corrosion-resistant lining 215. The SCWO reactor 210 comprises a vessel 220, a heat exchanger 240, an oxygenating section 260, and a trap 280.

The vessel 220 has an inner surface which is coated with a corrosion-resistant lining 215. The lining 215 is an artificial ceramic or diamond coating. The artificial diamond coating is thin and crystal-like in structure. The properties and structure of lining 215 are similar to lining 15.

The vessel 220 has an opening 224 where an aqueous solution of hazardous and radioactive mixed waste enters. A seal assembly 225 inserts between the end of the vessel 220 and a pump (not shown) for the SCWO system. The seal assembly 225 prevents leakage of hazardous waste between the interface of the pump and the vessel. The seal assembly 225 may include a conventional seal such as an O-ring or a gasket or may include a spring-loaded, graphite-reinforced polytetrafluorethylene seal as shown in FIG. 4.

Referring again to FIG. 3, the heat exchanger 240 circumferentially surrounds the vessel 220. The heat exchanger has an inlet 242 for supplying hot fluid having a temperature in a range of 300° C. to 700° C. The hot fluid exits through outlets 244 and 246. Alteratively, the heat exchanger 240 comprises an electrical heating coil wrapped around the exterior of vessel 220. The heat exchanger 240 heats the aqueous mixed waste to supercritical values.

Positioned within the vessel 220 is an oxygenating section 260. Section 260 comprises a porous cylindrical baffle 262 having an inlet 264, and a plurality of disbursing holes 268. The cylindrical baffle 262 extends axially within the interior of the vessel. Inlet 264 receives an oxygenating agent such as oxygen or hydrogen peroxide. The agent travels within the baffle 262 and exits through the holes 268 into the aqueous mixed waste. The exterior surface of the baffle has an artificial diamond coating 265 similar to the lining 215 along the inner surface of the vessel. The coating 265 is thin and crystal-like in structure. The properties of coating 265 are similar to the lining 15 of FIG. 1.

Referring again to FIG. 3, a seal assembly 270 is located near an outlet 229 of the vessel. The seal assembly 270 preferably includes a spring-loaded, graphite-reinforced polytetrafluorethylene seal. Alternatively, the seal assembly 270 may include an O-ring or gasket held into place by a bolted down lid.

A trap 280 is also located at the outlet 229 of the vessel. The trap has two valves 282 and 284 for removing waste product separated from the aqueous mixture.

FIG. 4 illustrates a seal assembly in accordance with the present invention which includes a spring-loaded, graphite-reinforced polytetrafluorethylene seal 300. This type of seal provides an effective sealing method requiring minimal force and is practically self-sealing. The seal consists of a graphite reinforced body 310 with a spring 315 in the middle. The spring 315 pushes the two sides of the seal outside. One side of the seal touches the body of a vessel 320 and the other side of the seal touches a cap 330. When the pressure inside the vessel increases, it acts against the seal and pushes the lips even further towards the wall. Little force is necessary to maintain a seal.

The seal assembly shown in FIG. 4 eliminates the need for bolted-down lids used in a conventional sealing design and enables quick, automated opening and closing of the vessel. Automated opening and closing is achieved by threading both the cap 330 and the vessel body 320 and leaving enough stock to take any axial stresses. A simple motor mechanism can feed the cap into the vessel. This automation provides considerable amount of safety to the operator.

The novel features of the present invention include the artificial diamond or diamond-like coating along the inner surface of the vessel and the exterior surface of the cylindrical baffle or the porous shaft of the SCWO reactor. Other novel features include cooling sections near the outlets of the vessel and spring-loaded, graphite-reinforced polytetrafluorethylene seals.

Advantages of the present invention include reduced corrosion and degradation of the seals and metallic parts located within a SCWO reactor and increased resistance to thermal shock and to interaction with radionuclides. Other advantages include quick, automated opening and closing of the SCWO reactor and increased resistance to high concentrations of halogens, acids, alkali metals, ammonia, and heavy metals.

Although the invention has been described relative to a specific embodiment thereof, numerous variations and modifications will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A supercritical water oxidation reactor, comprising:
   a vessel with an interior surface, the interior surface having a corrosion-resistant, artificial diamond coating;
   a cooling section, located at an inlet of said vessel, said first cooling section surrounding an outer region of said vessel;
   a heat exchanger, located contiguously to said first cooling section, said heat exchanger surrounding an inner region of said vessel;
   a second cooling section, located at an outlet of said vessel, said second cooling section surrounding a second outer region of said vessel;
   a porous cylindrical baffle, positioned within said cylindrical vessel, for transferring an oxygenating agent; and
   a trap, located at the outlet of said vessel, for removing waste products.

2. A supercritical water oxidation reactor as claimed in claim 1 further comprising a spring-loaded, graphite-reinforced polytetrafluorethylene seal located at each end of said vessel.

3. A supercritical water oxidation reactor as claimed in claim 1 wherein the exterior surface of said cylindrical baffle has a thin, artificial diamond-like coating.

4. A supercritical water oxidation reactor as claimed in claim 1 wherein the corrosion-resistant, artificial diamond coating has a thin, crystal-like structure.

5. A supercritical water oxidation reactor comprising:
   a vessel with an interior surface, the interior surface having a corrosion-resistant, artificial diamond coating;
   a first cooling section, located at an inlet of said cylindrical vessel, said first cooling section surrounding an outer region of the said vessel;
   a heat exchanger, located contiguously to said first cooling section, said heat exchanger surrounding an inner region of said vessel;
   a second cooling section, located at an outlet of said vessel, said second cooling section surrounding an outer region of said vessel;
   a porous shaft having a helical extension, said shaft being positioned within said vessel; and
   a trap, located at the outlet of said vessel, for removing waste products.

6. A supercritical water oxidation reactor as claimed in claim 5 further comprising a spring-loaded, graphite reinforced polytetrafluorethylene seal located at each outlet end of said vessel.

7. A supercritical water oxidation reactor as claimed in claim 4 wherein the exterior surface of said shaft has a thin, artificial diamond-like coating.

8. A supercritical water oxidation reactor as claimed in claim 5 wherein the corrosion-resistant, artificial diamond coating has a thin, crystal-like structure.

* * * * *